March 31, 1959 E. T. MALMROS 2,879,874
CENTRIFUGAL CLUTCH WITH THERMAL CONTROL
Filed Jan. 2, 1957
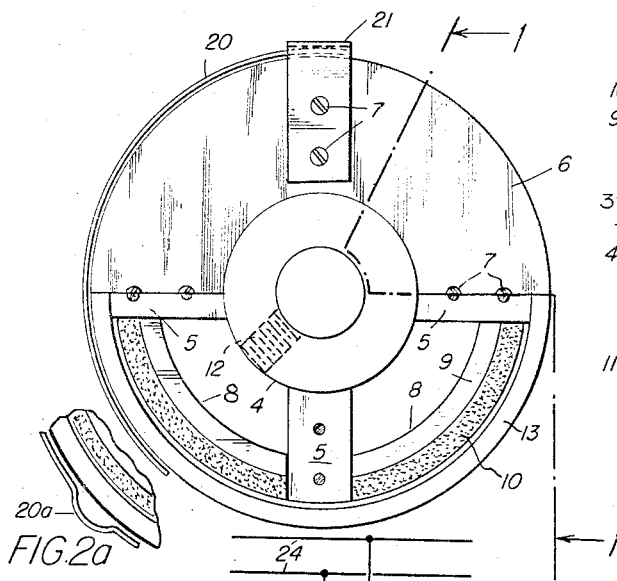
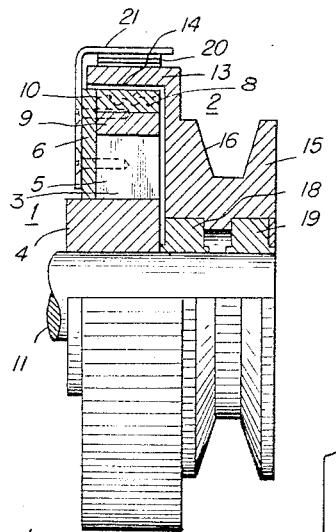
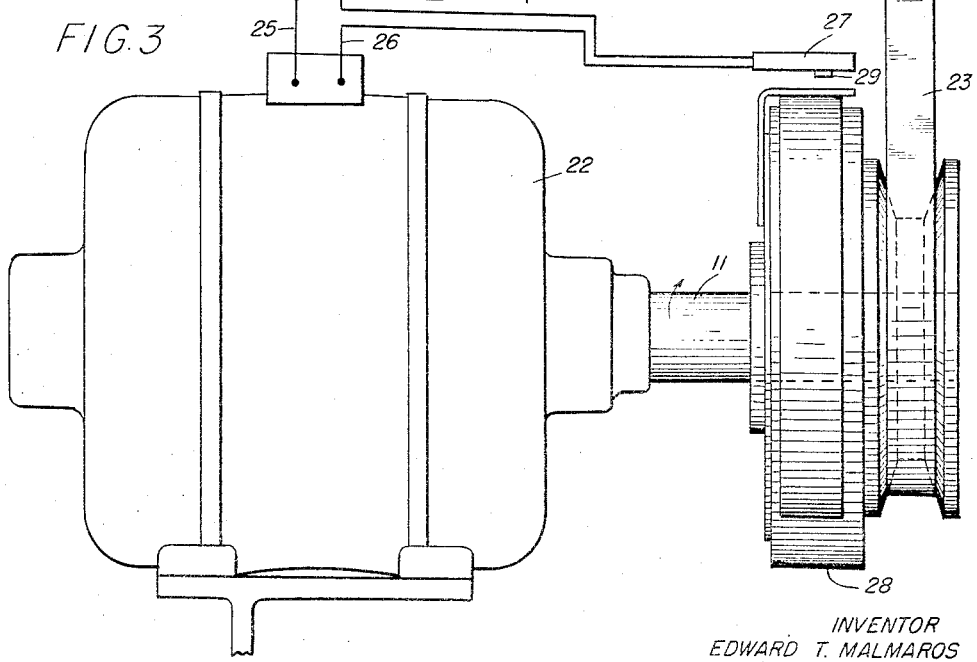
INVENTOR
EDWARD T. MALMAROS
By his ATTORNEYS
Howson and Howson United States Patent Office 2,879,874
Patented Mar. 31, 1959

2,879,874

CENTRIFUGAL CLUTCH WITH THERMAL CONTROL

Edward T. Malmros, Clark Township, Union County, N.J., assignor to Centric Clutch Company, Woodbridge, N.J., a corporation of New Jersey Application January 2, 1957, Serial No. 632,083

3 Claims. (Cl. 192—150)

This invention relates to a centrifugal clutch and in particular to a centrifugal clutch having a bimetallic thermally sensitive element designed to signal overloading of the clutch.

Centrifugal clutches as such have been known for many years and are in wide use in many industries. These clutches generally have an inner or central driving element and an outer driven element. The driving element is provided with a number of friction shoes which, when the driving element is rotated, move radially outwardly, contacting the driven element and carrying the driven element with the driving element. Centrifugal clutches of this general type have the advantages of simple construction and smooth starting. However, in applications where there is a tendency toward frequent overloading, clutches of this type become expensive to maintain because upon overload the shoes slip on the driven element, become worn, and must be replaced. There has therefore been a need for a centrifugal clutch which would automatically give a signal upon overload, permitting the clutch to be stopped until the overload condition was remedied.

It is an object of the present invention to provide a centrifugal clutch having means for signalling an overload condition of the clutch.

It is another object of the invention to provide a centrifugal clutch having a thermally sensitive bimetallic strip for signalling overload of said clutch.

It is a further object of the invention to provide a power train comprising a prime mover and a centrifugal clutch and including thermostatic means for shutting down said prime mover when said clutch is operated under overload conditions.

These and other objects of the invention are met by means of a centrifugal clutch comprising first and second rotatable coaxial members, the first member having a drum with an inner cylindrical surface and the second member having a series of circumferentially spaced pockets, and friction shoes located in said pockets of said second member, each shoe having a curved surface for contact with the inner cylindrical surface of the drum, the curved surface being slidable on the inner cylindrical surface of the drum on overload to heat the inner cylindrical surface of the drum, in combination with a bimetallic thermally sensitive element arranged in heat exchange relation with the inner cylindrical surface of said drum to signal overload of the clutch. Normally the first member is the driven member and the second is the driving member of the clutch.

In a preferred embodiment of the invention, the thermally sensitive element is a bimetallic strip positioned adjacent the outer surface of the drum and supported by the second member. It is preferably arranged substantially parallel to the outer surface of the drum and a switch is located adjacent to the strip so that when the drum is heated by the clutch shoes sliding on its inner surface the bimetallic strip will move, contacting the switch and shutting off power to the clutch.

The invention will be further described by means of the accompanying drawing in which Fig. 1 is a view partly in side elevation and partly in vertical section of a clutch including a bimetallic element according to the invention.

Fig. 2 is a front elevational view of a clutch according to the invention, the cover plate being shown removed in the lower part of the figure to illustrate the position of the friction shoes.

Fig. 2a is a fragmentary view showing an alternate form of the bimetallic element of Figs. 1 and 2.

Fig. 3 is a schematic view showing a power train comprising an electric motor, a switch and a clutch according to the invention.

Referring to the drawings, a clutch according to the invention comprises a central driving member 1 and an outer driven member 2. The driving member 1 comprises a spider 3 having a hub 4 and arms 5, a cover plate 6 attached to the spider 3 by means of screws 7 and friction shoes 8 which are seated in the pockets formed between the arms 5 of the spider 3.

The shoes 8 conventionally comprise a metal base 9 and a friction surface 10 made of a material such, for example, as brake lining. A shaft 11 may be fixed in the hub 4 of the driving member 1 by means of a set screw 12. The shaft 11 may be connected with a prime mover such, for example, as an electric motor 22 (Fig. 3).

The driven member 2, as shown in Figs. 1 and 2, comprises a body, indicated generally as 15 and a circumferential drum 13 having an inner cylindrical surface 14 which faces the outer surface of the brake shoes 8. The body 15 of driven member 2 is furnished with a sheave 16 to which a belt 23 (Fig. 3) may be fitted. The member 2 has a bore indicated generally as 17 which is fitted with bearings 18 and 19 to receive the shaft 11.

In accordance with the invention a bimetallic strip 20 having any conventional composition is mounted adjacent the outside of drum 13. The strip 20 is preferably curved and follows the curved outer periphery of the drum. As shown in Fig. 2a it may have a slight bump or raised section 20a along its length to facilitate interaction with a switch as will be later described.

The strip 20 is carried by a strap 21 which may be attached to the cover plate 6 by means of the screws 7. Any other conventional means of mounting the strip 20 may be employed.

As shown in Fig. 3 the novel clutch indicated generally as 28 may form part of a power train which may also comprise a prime mover, such for example, as the electric motor 22 and the belt 23. In the arrangement shown in Fig. 3 power for the motor 22 is drawn from a line 24 by means of lines 25 and 26. The line 26 contains a switch 27 having an operating button 29. The switch 27 is arranged adjacent the clutch 28. In operation power is supplied to the clutch via motor 22 and shaft 11. The driving member 1 (Figs. 1 and 2) of the clutch rotates and the shoes 8 are forced outwardly into contact with the surface 14 of the driven member 2. The frictional connection between the shoes 8 and the surface 14 is sufficient to cause the driven member 2 to rotate causing power to be supplied to the belt 23. On overload, the shoes 8 will slide on the surface 14 of the driven member 2 causing the drum portion 13 of the driven member 2 to become heated. This heat will be transmitted to the bimetallic strip 20 by radiation and other means causing the strip to straighten, and at its free end to move outwardly from its normal position adjacent the periphery of the drum 13. As it is extended outwardly it comes in contact with the button 29 of the switch 27 breaking the circuit through line 26 to the motor 22. The motor is thus automatically shut off and excessive wear on the lining surfaces 10 of the shoes is avoided.

It will be understood that many variations are possible in the structure shown in the drawings without parting from the invention. For example, the mechanical arrangement of the various parts in the interior of the clutch may be varied according to the particular type of installation which is to be serviced. Similarly the thermally sensitive bimetallic strip may operate to open or close a valve or simply to give a visual or audible signal indicating overload. It will, of course, be understood that the power may be supplied by any convenient prime mover such, for example, as a steam engine, an hydraulic motor or an internal combustion engine; and may be taken from the driven side of the clutch by means of a shaft, a gear arrangement or any other conventional mechanism.

What is claimed is:

1. A power train comprising a prime mover and a centrifugal clutch, said clutch having a driving member driven by said prime mover and a driven member, said driven member having a drum with an inner cylindrical surface and said driving member having a series of radially movable elements arranged to contact the inner cylindrical surface of said driven member and to slide on said surface during overload thereby to heat said driven member, a thermally sensitive bimetallic strip positioned adjacent the driven member in heat exchange relationship therewith and switch means positioned adjacent said bimetallic strip and operable by said bimetallic strip to stop said prime mover upon overload of said clutch.

2. A centrifugal clutch comprising first and second relatively rotatable coaxial members, said first member having a drum with an inner cylindrical surface and an outer peripheral surface, and said second member having a series of circumferentially spaced pockets, and friction shoes located in said pockets of said second member, each shoe having a curved surface for contact with said inner cylindrical surface, said curved surface being slidable on said inner cylindrical surface on overload to heat said inner cylindrical surface; in combination with a bimetallic thermally sensitive element positioned adjacent said outer peripheral surface and arranged in heat exchange relation with said inner cylindrical surface to signal overload of said clutch, said thermally sensitive element being a curved strip positioned substantially parallel to the outer cylindrical surface of the drum.

3. A centrifugal clutch comprising first and second relatively rotatable coaxial members, said first member having a drum with an inner cylindrical surface and an outer peripheral surface, and said second member having a series of circumferentially spaced pockets, and friction shoes located in said pockets of said second member, each shoe having a curved surface for contact with said inner cylindrical surface, said curved surface being slidable on said inner cylindrical surface on overload to heat said inner cylindrical surface; in combination with a bimetallic thermally sensitive element positioned adjacent said outer peripheral surface and arranged in heat exchange relation with said inner cylindrical surface to signal overload of said clutch, and a switch, said thermally sensitive element being a strip having a raised section for actuating said switch on overheating of the clutch.

References Cited in the file of this patent

UNITED STATES PATENTS

| | | |
|---|---|---|
| 1,907,540 | Hebler | May 9, 1933 |
| 1,957,051 | Norton | May 1, 1934 |
| 1,960,915 | Morse | May 29, 1934 |
| 2,753,967 | Bowers | July 10, 1956 |